(12) United States Patent
Li et al.

(10) Patent No.: US 10,771,599 B2
(45) Date of Patent: Sep. 8, 2020

(54) METHOD AND ELECTRONIC DEVICE FOR PROCESSING INFORMATION

(71) Applicants: BEIJING LENOVO SOFTWARE LTD., Beijing (CN); LENOVO (BEIJING) LIMITED, Beijing (CN)

(72) Inventors: Fenglang Li, Beijing (CN); Xiangying Zhang, Beijing (CN); Run Yang, Beijing (CN); Ning Wang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 820 days.

(21) Appl. No.: 14/217,753

(22) Filed: Mar. 18, 2014

(65) Prior Publication Data

US 2014/0286355 A1 Sep. 25, 2014

(30) Foreign Application Priority Data

Mar. 19, 2013 (CN) .......................... 2013 1 0086867
Mar. 19, 2013 (CN) .......................... 2013 1 0086888

(51) Int. Cl.
*H04L 29/06* (2006.01)
*G08B 3/10* (2006.01)
(Continued)

(52) U.S. Cl.
CPC .............. *H04L 69/24* (2013.01); *H04L 29/06* (2013.01); *G08B 3/1016* (2013.01);
(Continued)

(58) Field of Classification Search
None
See application file for complete search history.

(56) References Cited

U.S. PATENT DOCUMENTS

| 2008/0195706 A1* | 8/2008 | Li | H04L 12/1818 |
| | | | 709/205 |
| 2014/0049636 A1* | 2/2014 | O'Donnell | G08C 17/02 |
| | | | 348/143 |
| 2014/0070922 A1* | 3/2014 | Davis | G08B 3/1016 |
| | | | 340/6.1 |

FOREIGN PATENT DOCUMENTS

CN 101615952 A 12/2009

OTHER PUBLICATIONS

Sun, Yansen; Beijing University of Technology; Masteral Dissertation (Part 1 and Part 2); Research and Design of Point to Multipoint Audio and Video Transmission Technology Base on Bluetooth; Apr. 2009; with English abstract.

* cited by examiner

*Primary Examiner* — Vinncelas Louis
(74) *Attorney, Agent, or Firm* — Scully Scott Murphy & Presser

(57) ABSTRACT

A method and an electronic device for processing information are provided. The method is applied in a first electronic device. There is a first correspondence relation between the first electronic device and N second electronic devices, where N is an integer greater than or equal to 1. The method has the steps of detecting to acquire a first operation for the first electronic device, judging whether the first operation meets a first preset condition, and generating by the first electronic device a first prompt effect for the first operation and controlling each of the N second electronic devices to generate the first prompt effect when the first operation meets the first preset condition. The correspondence relation among multiple electronic devices can be determined more conveniently. A prompting method and a related electronic device are also provided to accurately prompt the data transmission process.

26 Claims, 5 Drawing Sheets

(51) Int. Cl.
*H04L 12/18* (2006.01)
*H04N 21/2343* (2011.01)
*H04N 21/462* (2011.01)
*H04N 21/218* (2011.01)
*H04N 21/2385* (2011.01)
*H04N 7/18* (2006.01)

(52) U.S. Cl.
CPC .......... *H04L 12/1818* (2013.01); *H04N 7/183* (2013.01); *H04N 21/21805* (2013.01); *H04N 21/2385* (2013.01); *H04N 21/234363* (2013.01); *H04N 21/4621* (2013.01)

METHOD AND ELECTRONIC DEVICE FOR PROCESSING INFORMATION

CROSS REFERENCE TO RELATED APPLICATIONS

This application claims the benefit and priority of a Chinese Patent Application Serial Number 201310086888.0 filed on Mar. 19, 2013 and a Chinese Patent Application Serial Number 201310086867.9 filed on Mar. 19, 2013, all of which is incorporated herein by reference.

FIELD OF THE INVENTION

The present invention relates to the field of data transmission, and in particular, to a method and an electronic device for processing information.

BACKGROUND OF THE INVENTION

With the continuous development of the science and technology, the electronic technology is also developed rapidly and more kinds of electronic products are becoming available. People may enjoy the convenience brought by the development of the science and technology. Nowadays, people may enjoy comfortable life brought by the development of the science and technology through various kinds of electronic devices.

In prior art, there may be correspondence relations among multiple electronic devices. For example, devices which support the same data transmission protocol may perform data transmission, instruction control, or the like, with each other.

The inventor of the present application discovers at least following technical problems with respect to the prior art during the process for implementing the technical solutions of the embodiments of the present application.

In the prior art, when there are correspondence relations among multiple electronic devices, the users of the electronic devices can only determine whether there are correspondence relations among the devices by querying the electronic devices one by one. Therefore, it is inconvenient to determine whether there are correspondence relations among multiple electronic devices.

Furthermore, in the prior art, when data transmissions are performed among the electronic devices, different prompt information cannot be generated for different stages of the data transmissions. Therefore, the prompting for the data transmission process is not precise enough.

SUMMARY OF THE INVENTION

An embodiment of the present invention provides a method and an electronic device for processing information to address the technical problem in the prior art that it is not convenient enough to determine whether there are correspondence relations among multiple electronic devices.

In one aspect, an embodiment of the present application provides a technical solution as follows.

A method for processing information for use in a first electronic device, wherein there is a first correspondence relation between the first electronic device and N second electronic devices, where N is an integer greater than or equal to 1, the method comprising:
detecting to acquire a first operation for the first electronic device;
judging whether the first operation meets a first preset condition; and
generating, by the first electronic device, a first prompt effect for the first operation and controlling each of the N second electronic devices to generate the first prompt effect when the first operation meets the first preset condition.

Optionally, the judging whether the first operation meets a first preset condition comprises:
judging whether the first operation is an operation of data transmission.

Optionally, when there are data connections between the N second electronic devices and the first electronic device, the controlling each of the N second electronic devices to generate the first prompt effect comprises:
transmitting first connection requests to the N second electronic devices such that the N second electronic devices generate the first prompt effect based on the first connection requests.

Optionally, when the first electronic device is connected to the N second electronic devices via a server, the controlling each of the N second electronic devices to generate the first prompt effect comprises:
transmitting a first connection request to the server such that the N second electronic devices are controlled by the server to generate the first prompt effect.

Optionally, the controlling each of the N second electronic devices to generate the first prompt effect comprises:
broadcasting a first connection request in the network system in which the first electronic device resides such that the N second electronic devices generate the first prompt effect after they have received the first connection request.

Optionally, after the judging whether the first operation meets a first preset condition, the method further comprises:
establishing data transmission channels between the first electronic device and L second electronic devices of the N second electronic devices when the first operation meets the first preset condition, where L is an integer less than or equal to N.

Optionally, the establishing data transmission channels between the first electronic device and the L second electronic devices of the N second electronic devices comprises:
receiving K pieces of feedback information sent from K second electronic devices of the N second electronic devices, wherein the feedback information represents consent to establish the data connection with the first electronic device, and K is an integer greater than or equal to L and less than or equal to N; and
establishing the data transmission channels between the first electronic device and the L second electronic devices based on the K pieces of feedback information.

Optionally, the establishing the data transmission channels between the first electronic device and the L second electronic devices based on the K pieces of feedback information comprises:
displaying K pieces of identification information corresponding to the K pieces of feedback information on a display unit of the first electronic device;
determining L pieces of identification information of the K identification information corresponding to the L second electronic devices based on a first selection operation from the user of the first electronic device; and establishing the data transmission channels between the first electronic device and the L second electronic devices based on the L pieces of identification information.

Optionally, the data transmission comprises at least P sub transmission stages and the P sub transmission stages correspond to P prompt effects in a first prompt mode in a one-to-one manner, wherein P is an integer greater than or equal to 2, the establishing the data transmission channels between the first electronic device and the L second electronic devices of the N second electronic devices further comprises:

determining a first prompt effect of the P prompt effects corresponding to a first sub transmission stage at the time of T1 when the transmission between the first electronic device and the L second electronic devices is in the first sub transmission stage of the P sub transmission stages, wherein the fact that the first operation meets the first preset condition represents the transmission between the first electronic device and the L second electronic devices is in the first sub transmission stage;

generating and outputting the first prompt effect;

determining a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and generating and outputting the second prompt effect.

Optionally, the first sub transmission stage specifically is a stage where there are data transmission channels established between the first electronic device and the L second electronic devices, and the first prompt effect specifically is a prompt effect which prompts with light of a first preset intensity; or the first sub transmission stage specifically is a stage where there is a first correspondence relation between the first electronic device and the L second electronic devices but no data connection is established, and the first prompt effect specifically is a prompt effect which prompts with light of a second preset intensity; or the second sub transmission stage specifically is a stage where the first electronic device and the L second electronic devices perform data transmission therebetween, and the second prompt effect specifically is a prompt effect which prompts by emitting light at a preset frequency; or the second sub transmission stage specifically is a stage where there are data transmission channels established between the first electronic device and the L second electronic devices but no data transmission is performed, and the second prompt effect specifically is a prompt effect which prompts with light of a third preset intensity.

Optionally, after the establishing the data transmission channels between the first electronic device and the L second electronic devices of the N second electronic devices, the method further comprises:

acquiring first data from the L second electronic devices.

Optionally, the acquiring first data from the L second electronic devices comprises:

acquiring the first data from preset directories of the L second electronic devices; or acquiring the first data based on a second selection operation of the user.

Optionally, after the establishing the data transmission channels between the first electronic device and the L second electronic devices of the N second electronic devices, the method further comprises:

judging whether there is a second operation for the first electronic device which meets a second preset condition; and disconnecting the data transmission channels when there is a second operation.

In another aspect, another embodiment of the present application provides a technical solution as follows.

An electronic device, wherein there is a first correspondence relation between the electronic device and N second electronic devices, where N is an integer greater than or equal to 1, characterized in that the electronic device comprises:

a detecting module configured to detect to acquire a first operation for the electronic device;

a judging module configured to judge whether the first operation meets a first preset condition; and a generating module configured to generate, by the electronic device, a first prompt effect for the first operation and controlling each of the N second electronic devices to generate the first prompt effect when the first operation meets the first preset condition.

Optionally, the judging module is further configured to:

judge whether the first operation is an operation of data transmission.

Optionally, when there are data connections between the N second electronic devices and the electronic device, the generating module is further configured to:

transmit first connection requests to the N second electronic devices such that the N second electronic devices generate the first prompt effect based on the first connection requests.

Optionally, when the electronic device is connected to the N second electronic devices via a server, the generating module is further configured to:

transmit a first connection request to the server such that the N second electronic devices are controlled by the server to generate the first prompt effect.

Optionally, the generating module is further configured to:

broadcast a first connection request in the network system in which the electronic device resides such that the N second electronic devices generate the first prompt effect after they have received the first connection request.

Optionally, the electronic device further comprises:

an establishing module configured to, after it is judged whether the first operation meets a first preset condition, establish data transmission channels between the electronic device and L second electronic devices of the N second electronic devices when the first operation meets the first preset condition, where L is an integer less than or equal to N.

Optionally, the establishing module further comprises:

a receiving unit configured to receive K pieces of feedback information sent from K second electronic devices of the N second electronic devices, wherein the feedback information represents consent to establish the data connection with the electronic device, and K is an integer greater than or equal to L and less than or equal to N; and an establishing unit configured to establish the data transmission channels between the electronic device and the L second electronic devices based on the K pieces of feedback information.

Optionally, the establishing unit further comprises:
 a displaying sub-unit configured to display K pieces of identification information corresponding to the K pieces of feedback information on a display unit of the electronic device;
 a determining sub-unit configured to determine L pieces of identification information of the K identification information corresponding to the L second electronic devices based on a first selection operation from the user of the electronic device; and
 an establishing sub-unit configured to establish the data transmission channels between the electronic device and the L second electronic devices based on the L pieces of identification information.

Optionally, when the data transmission comprises at least P sub transmission stages and the P sub transmission stages correspond to P prompt effects in a first prompt mode in a one-to-one manner, wherein P is an integer greater than or equal to 2, the establishing module further comprises:
 a first determining unit configured to determine a first prompt effect of the P prompt effects corresponding to a first sub transmission stage at the time of T1 when the transmission between the electronic device and the L second electronic devices is in the first sub transmission stage of the P sub transmission stages, wherein the fact that the first operation meets the first preset condition represents the transmission between the electronic device and the L second electronic devices is in the first sub transmission stage;
 a first generating unit configured to generate and output the first prompt effect;
 a second determining unit configured to determine a second prompt effect of the P prompt effects corresponding to a second sub transmission stage at the time of T2 which is later than T1 when the transmission between the electronic device and the L second electronic devices is in the second sub transmission stage of the P sub transmission stages, wherein the second prompt effect is a prompt effect different from the first prompt effect; and
 a second generating unit configured to generate and output the second prompt effect.

Optionally, the first sub transmission stage is a stage where there are data transmission channels established between the electronic device and the L second electronic devices, and the first prompt effect is a prompt effect which prompts with light of a first preset intensity; or
 the first sub transmission stage is a stage where there is a first correspondence relation between the electronic device and the L second electronic devices but no data connection is established, and the first prompt effect is a prompt effect which prompts with light of a second preset intensity; or
 the second sub transmission stage is a stage where the electronic device and the L second electronic devices perform data transmission therebetween, and the second prompt effect is a prompt effect which prompts by by emitting light at a preset frequency; or
 the second sub transmission stage is a stage where there are the data transmission channels established between the electronic device and the L second electronic devices but no data transmission is performed, and the second prompt effect is a prompt effect which prompts with light of a third preset intensity.

Optionally, the electronic device further comprises:
 an acquiring module configured to, after the data transmission channels have been established between the electronic device and the L second electronic devices of the N second electronic devices, acquire first data from the L second electronic devices.

Optionally, the acquiring module is further configured to:
 acquire the first data from preset directories of the L second electronic devices; or
 acquire the first data based on a second selection operation of the user.

Optionally, the electronic device further comprises:
 a judging module configured to, after the data transmission channels have been established between the electronic device and the L second electronic devices of the N second electronic devices, judge whether there is a second operation for the electronic device which meets a second preset condition; and
 a disconnecting module configured to disconnect the data transmission channels when there is a second operation.

In yet another aspect, an embodiment of the present application provides a technical solution as follows.

A prompting method for use in a first electronic device, wherein there is data transmission between the first electronic device and L second electronic devices, where L is an integer greater than or equal to 1, the data transmission comprising at least P sub transmission stages, and the P sub transmission stages corresponding to P prompt effects in a first prompt mode in a one-to-one manner, where P is an integer greater than or equal to 2, the method comprising:
 determining a first prompt effect of the P prompt effects corresponding to a first sub transmission stage at the time of T1 when the transmission between the first electronic device and the L second electronic devices is in the first sub transmission stage of the P sub transmission stages;
 generating and outputting the first prompt effect;
 determining a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and
 generating and outputting the second prompt effect.

Optionally, the first sub transmission stage is a stage where there are data transmission channels established between the first electronic device and the L second electronic devices, and the first prompt effect is a prompt effect which prompts with light of a first preset intensity; or
 the first sub transmission stage is a stage where there is a first correspondence relation between the first electronic device and the L second electronic devices but no data connection is established, and the first prompt effect is a prompt effect which prompts with light of a second preset intensity; or
 the second sub transmission stage is a stage where the first electronic device and the L second electronic devices perform data transmission therebetween, and the second prompt effect is a prompt effect which prompts by emitting light at a preset frequency; or the second sub transmission stage is a stage where there are data transmission channels established between the first electronic device and the L second electronic devices but no data transmission is performed, and the second prompt effect is a prompt effect which prompts with light of a third preset intensity.

In another aspect, another embodiment of the present application provides a technical solution as follows.

An electronic device, wherein there is data transmission between the electronic device and L second electronic devices, where L is an integer greater than or equal to 1, the data transmission comprising at least P sub transmission stages, and the P sub transmission stages corresponding to P prompt effects in a first prompt mode in a one-to-one manner, where P is an integer greater than or equal to 2, the electronic device comprising:

a first determining module configured to determine a first prompt effect of the P prompt effects corresponding to a first sub transmission stage at the time of T1 when the transmission between the electronic device and the L second electronic devices is in the first sub transmission stage of the P sub transmission stages;

a first generating module configured to generate and output the first prompt effect;

a second determining module configured to determine a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and a second generating module configured to generate and output the second prompt effect.

Optionally, the first sub transmission stage is a stage where there are data transmission channels established between the electronic device and the L second electronic devices, and the first prompt effect is a prompt effect which prompts with light of a first preset intensity; or the first sub transmission stage is a stage where there is a first correspondence relation between the electronic device and the L second electronic devices but no data connection is established, and the first prompt effect is a prompt effect which prompts with light of a second preset intensity; or the second sub transmission stage is a stage where the electronic device and the L second electronic devices perform data transmission therebetween, and the second prompt effect is a prompt effect which prompts by emitting light at a preset frequency; or the second sub transmission stage is a stage where there are the data transmission channels established between the electronic device and the L second electronic devices but no data transmission is performed, and the second prompt effect is a prompt effect which prompts with light of a third preset intensity.

One or more technical solutions provided by the embodiments of the present application have at least following technical effects or advantages.

(1) In the embodiments of the present application, when there is a first correspondence relation between the first electronic device and the N second electronic devices, if there is a first operation for the first electronic device which meets the first preset condition, the first electronic device and the N second electronic devices may be controlled to generate the first prompt effect. Therefore, the correspondence relation between the first electronic device and the N second electronic devices can be prompted, and thereby a technical effect where the correspondence relation among multiple electronic devices can be determined conveniently can be achieved.

(2) In the embodiments of the present application, the N second electronic devices may be controlled in multiple manners to generate the first prompt effect. For example, when there are data connections between the first electronic device and the N second electronic devices, the N second electronic devices are controlled to generate the first prompt effect based on the first connection requests sent to the N second electronic devices; or when the first electronic device is connected to the N second electronic devices via a server, the first connection request is sent to the server so as to control the N second electronic devices to generate the first prompt effects; or the first connection request is broadcasted in the network system in which the first electronic device resides so as to control the N second electronic devices to generate the first prompt information; or the like. Therefore, a technical effect where the N electronic devices are controlled to generate the first prompt information in a diversified manner can be achieved.

(3) In the embodiments of the present application, data transmission channels may be established between the first electronic device and the L second electronic devices of the N second electronic devices, and different stages of the data transmission performed by the first electronic device and the L second electronic devices can be prompted by different prompt effects. Therefore, a technical effect where the data transmission process performed between the first electronic device and the N second electronic devices can be prompted more precisely can be achieved.

(4) In the embodiments of the present application, after the data transmission channels between the first electronic device and the L second electronic devices have been established, the first electronic device may further acquire the first data from the L second electronic devices, wherein the first data may be acquired from the preset directories of the L second electronic devices, or the first data may be acquired based on the second selection operation of the user. Therefore, a technical effect where the manners in which the first data is acquired are more convenient and diversified can be achieved.

(5) In the embodiments of the present application, after the data transmission channels between the first electronic device and the L second electronic devices have been established, if the second operation which meets the second preset condition is detected, the data transmission channels can be disconnected. Therefore, a technical effect where it is more convenient to control the data transmission process performed between the first electronic device and the L second electronic devices can be achieved.

DETAILED DESCRIPTION OF PREFERRED EMBODIMENTS

Figure 1:
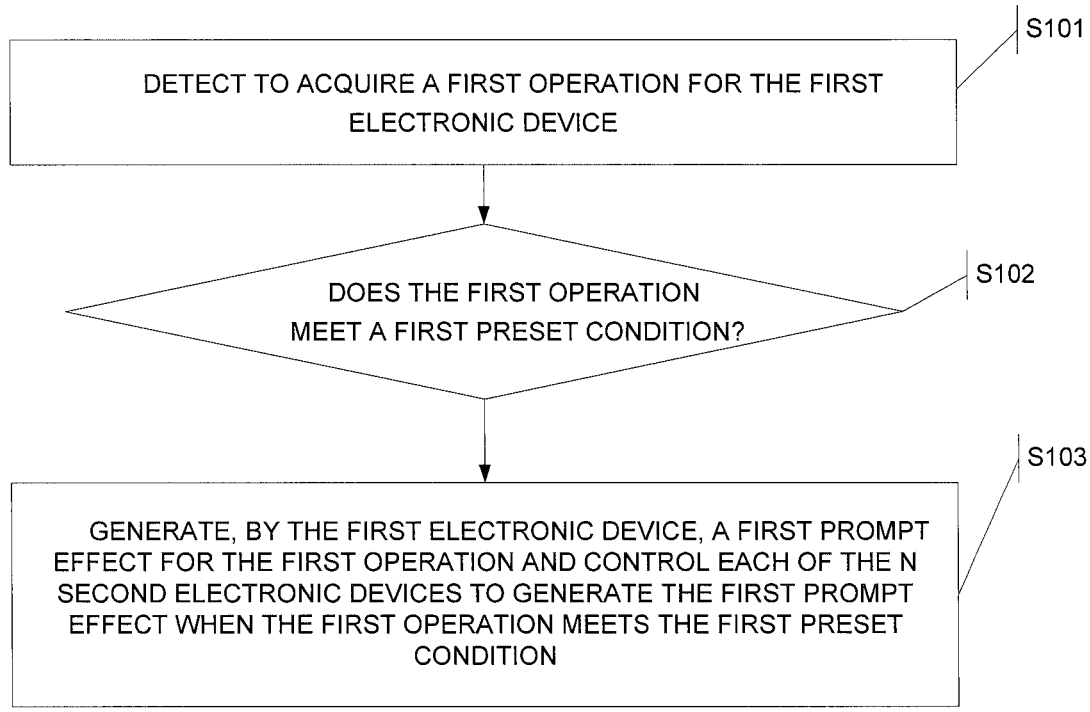
FIG. 1 is a flow chart illustrating a method for processing information according to an embodiment of the present application.

The embodiments of the present invention provide a method and an electronic device for processing information to address the technical problem of the prior art that it is not convenient enough to determine whether there is a correspondence relation among multiple electronic devices.

The technical solutions of the embodiments of the present application provide an overall concept below to address the above technical problem:

A method for processing information for use in a first electronic device, wherein there is a first correspondence relation between the first electronic device and N second electronic devices, where N is an integer greater than or equal to 1, the method comprising: detecting to acquire a first operation for the first electronic device; judging whether the first operation meets a first preset condition; and generating, by the first electronic device, a first prompt effect for the first operation and controlling each of the N second electronic devices to generate the first prompt effect when the first operation meets the first preset condition.

In the above solution, when there is a first correspondence relation between the first electronic device and the N second electronic devices, if there is a first operation for the first electronic device which meets the first preset condition, the first electronic device and the N second electronic devices may be controlled to generate the first prompt effect. Therefore, the correspondence relation between the first electronic device and the N second electronic devices can be prompted, and thereby a technical effect where the correspondence relation among multiple electronic devices can be determined conveniently can be achieved.

A prompting method for use in a first electronic device is provided, wherein there is data transmission between the first electronic device and L second electronic devices, where L is an integer greater than or equal to 1, the data transmission comprising at least P sub transmission stages, and the P sub transmission stages corresponding to P prompt effects in a first prompt mode in a one-to-one manner, where P is an integer greater than or equal to 2, the method comprising:

determining a first prompt effect of the P prompt effects corresponding to a first sub transmission stage at the time of T1 when the transmission between the first electronic device and the L second electronic devices is in the first sub transmission stage of the P sub transmission stages; generating and outputting the first prompt effect; determining a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and generating and outputting the second prompt effect.

In the above solution, when there are data transmissions between the first electronic device and the L second electronic devices, different prompt effects can be utilized based on different stages of the data transmission. Therefore, a technical effect where the data transmission process performed between the first electronic device and the N second electronic devices can be prompted more precisely can be achieved.

To understand the above technical solutions better, detailed description of the technical solutions of the present invention will be given with reference to the drawings and specific embodiments. It is to be appreciated that the embodiments of the present invention and the specific features of the embodiments are given to explain the technical solutions of the present invention, rather than limit the technical solutions of the present invention. The embodiments of the present invention and the technical features of the embodiments may be combined with each other if there is no conflict therebetween.

In an aspect, the embodiments of the present application provide a method for processing information for use in a first electronic device. The first electronic device is, for example, a cellphone, a notebook computer, a tablet computer, etc. There is a first correspondence relation between the first electronic device and N second electronic devices, where N is an integer greater than or equal to 1. The N second electronic devices are, for example, notebook computers, cellphones, tablet computers, etc. Any two electronic devices of the first electronic device and the N second electronic devices may be the same electronic device or different electronic devices. The first correspondence relation is, for example, that the first electronic device may control the N second electronic devices to playback multimedia data, or there are same data transmission protocols between the first electronic device and the N second electronic devices, or the like.

Now referring to FIG. 1, the method for processing information comprises:

Step S101: detecting to acquire a first operation for the first electronic device;

Step S102: judging whether the first operation meets a first preset condition; and Step S103: generating, by the first electronic device, a first prompt effect for the first operation and controlling each of the N second electronic devices to generate the first prompt effect when the first operation meets the first preset condition.

In step S101, the first operation may be any operation, such as, an operation of clicking on a certain button disposed in the electronic device, an operation of sliding in a preset direction, an operation of generating a voice message, or the like. The embodiments of the present application are not limited thereto.

In step S102, the first preset condition may be any preset condition, and therefore the judging process of step S102 may be also different. The judging whether the first operation meets a first preset condition is, for example, judging whether the first operation is an operation of data transmission; or the judging whether the first operation meets a first preset condition is, for example, judging whether the first operation is an operation of controlling the N second electronic device, based on the first electronic device, to playback multimedia data; or the like. In a specific implementation, the correspondence relation between the multiple operations and controls may be defined in the first electronic device, and thereby whether the first operation meets the first preset condition is judged based on the correspondence relation.

In step S103, based on the different connection modes between the first electronic device and the N second electronic devices, the manners in which the N second electronic devices are controlled to generate the first prompt effect are different. Three of these manners are introduced below. However, in a specific implementation, it is not limited to these three manners, and in a specific implementation, the N second electronic devices may be controlled to generate the first prompt effect by combining multiple manners.

First manner in which, when there are data connections between the N second electronic devices and the first electronic device, the controlling each of the N second electronic devices to generate the first prompt effect comprises:

transmitting first connection requests to the N second electronic devices such that the N second electronic devices generate the first prompt effect based on the first connection requests.

To be specific, there are data connections between the first electronic device and the N second electronic devices, and therefore the first electronic device does not need to look for the N second electronic devices which correspond to the first electronic device in a one-to-one manner in the network, and the first electronic device may transmit a first connection request to the N second electronic devices. After the N second electronic devices have received the first connection request, they may generate the first prompt effect.

Second manner in which, when the first electronic device is connected to the N second electronic devices via a server, the controlling each of the N second electronic devices to generate the first prompt effect comprises:

transmitting a first connection request to the server such that the N second electronic devices are controlled by the server to generate the first prompt effect.

To be specific, the first electronic device and the N second electronic devices perform data transmissions with each other via the server. However, the first electronic device does not know what kind of electronic devices correspond to the first electronic device in a one-to-one manner in the network system in which the first electronic device resides, and therefore it transmits the first connection request to the server. After the server receives the first connection request, a query is performed in the server to recognize the N second electronic devices which have a first correspondence relation with the first electronic device. Then, the first connection request is transmitted to the N second electronic devices. After the N second electronic devices have received the first connection request, they generate the first prompt effect.

Third manner in which, the controlling each of the N second electronic devices to generate the first prompt effect comprises:

broadcasting a first connection request in the network system in which the first electronic device resides such that the N second electronic devices generate the first prompt effect after they have received the first connection request.

To be specific, the first electronic device and the N second electronic devices reside in the same network system. The network system may comprise other electronic devices which have no first correspondence relation with the first electronic device. When the first electronic device needs to determine the N electronic devices which have the first correspondence relation with the first electronic device, it transmits the first connection request by broadcasting it to the network system, and all electronic devices in the network system receive the first connection request. The N second electronic devices will generate the first prompt effect after the first connection request is received because they have the first correspondence relation with the first electronic device. Therefore, the presence of the first correspondence relation is prompted.

Based on the above description, in the embodiments of the present application, the N second electronic devices may be controlled in multiple manners to generate the first prompt effect. For example, when there are data connections between the first electronic device and the N second electronic devices, the N second electronic devices are controlled to generate the first prompt effect based on the first connection requests sent to the N second electronic devices; or when the first electronic device is connected to the N second electronic devices via the server, the first connection request is sent to the server so as to control the N second electronic devices to generate the first prompt effects; or the first connection request is broadcasted in the network system in which the first electronic device resides so as to control the N second electronic devices to generate the first prompt information; or the like. Therefore, a technical effect where the N electronic devices are controlled to generate the first prompt information in a diversified manner can be achieved.

In a specific implementation, after the judging whether the first operation meets a first preset condition in step S102, the method further comprises:

establishing data transmission channels between the first electronic device and L second electronic devices of the N second electronic devices when the first operation meets the first preset condition, where L is an integer less than or equal to N.

Figure 2:
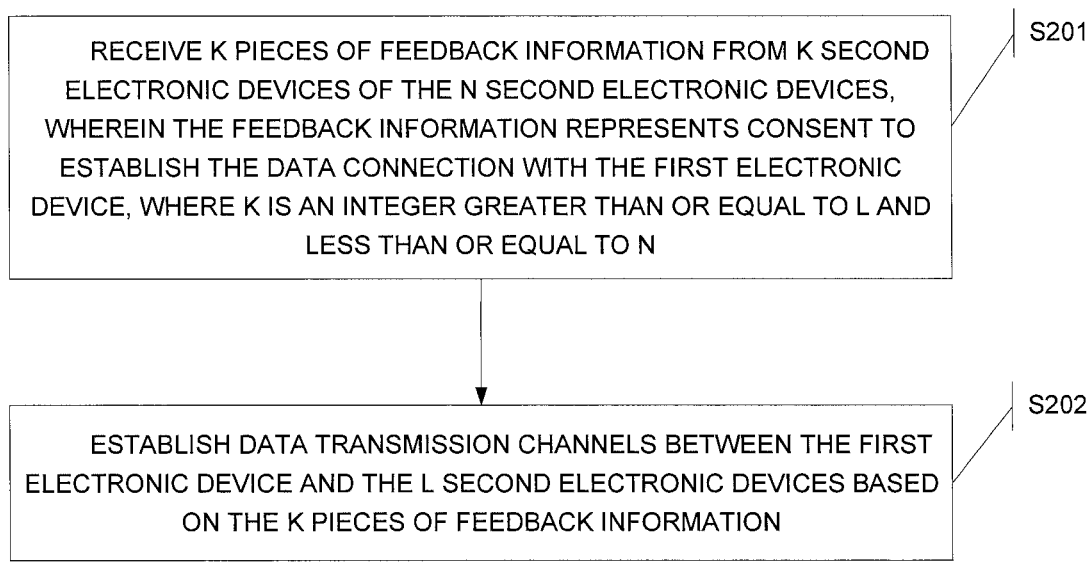
FIG. 2 is a flow chart illustrating a process of establishing data transmission channels in the method for processing information according to the embodiment of the present application.

In a specific implementation, as shown in FIG. 2, the process of establishing data transmission channels may further comprise:

Step S201: receiving K pieces of feedback information sent from K second electronic devices of the N second electronic devices, wherein the feedback information represents consent to establish the data connection with the first electronic device, and K is an integer greater than or equal to L and less than or equal to N; and Step S202: establishing the data transmission channels between the first electronic device and the L second electronic devices based on the K pieces of feedback information.

In step S201, after the N second electronic devices receive the first connection request, in addition to generating the first prompt effect, they determine whether to establish data transmission channels with the first electronic device, wherein whether to establish the data transmission channels with the first electronic device can be determined by using a selection operation from the user of the N second electronic devices. The K second electronic devices each transmit a piece of feedback information to the first electronic device if they agree to establish the data transmission channels with the first electronic device. After the first electronic device receives the pieces of feedback information, it may determine whether to establish the data transmission channels with the K second electronic devices.

If all of the N second electronic devices agree to establish the data transmission channels with the first electronic device, then K and M are identical; however, if some of the N second electronic devices do not agree to establish the data transmission channels with the first electronic device, then K is less than N.

In a specific implementation, in step S202, the process of establishing the data transmission channels between the first electronic device and the L second electronic devices based on the K pieces of feedback information may comprise multiple cases. Two of them will be introduced below. Of course, in a specific implementation, it is not limited to these two cases.

First, the establishing the data transmission channels between the first electronic device and the L second electronic devices of the N second electronic devices specifically comprises:

displaying K pieces of identification information corresponding to the K pieces of feedback information on a display unit of the first electronic device; determining L pieces of identification information of the K identification information corresponding to the L second electronic devices based on a first selection operation from the user of the first electronic device; establishing the data transmission channels between the first electronic device and the L second electronic devices based on the L pieces of identification information.

To be specific, the K pieces of identification information are displayed on the display unit of the first electronic device, a dialog is provided to the user of the first electronic device to choose the L pieces of identification information of the K pieces of identification information corresponding to the L second electronic devices, and then the data transmission channels between the first electronic device and the L second electronic devices are established.

Second, the establishing the data transmission channels between the first electronic device and the L second electronic devices of the N second electronic devices specifically comprises:

detecting connect rates between each of the K second electronic device and the first electronic device to acquire K connection rates; determining L connection rates of the K connection rates which are greater than a first preset connection rate, and thereby determining the L second electronic devices; then establishing the data connection channels between the first electronic device and the L second electronic devices.

To be specific, when there are multiple second electronic devices that can establish data connection channels with the first electronic device, the L second electronic device that have the fastest connection rates will be selected to guarantee the data can be delivered in time.

In a specific implementation, the data transmission comprises at least P sub transmission stages and the P sub transmission stages correspond to P prompt effects in a first prompt mode in a one-to-one manner, wherein P is an integer greater than or equal to 2.

Figure 3:
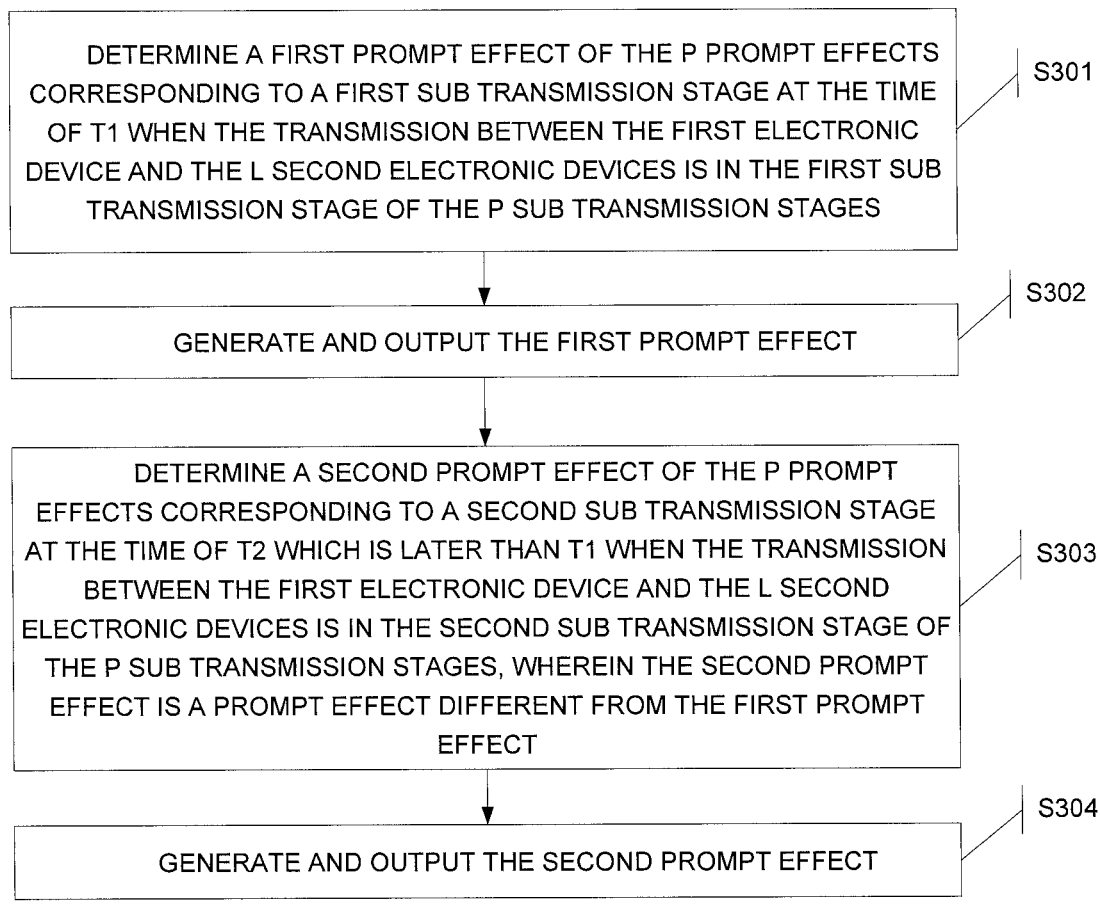
FIG. 3 is a flow chart illustrating a process of utilizing different prompt information for different stages of the data transmission in the method for processing information according to the embodiment of the present application.

In step S202, as shown in FIG. 3, the establishing the data transmission channels between the first electronic device and the L second electronic devices of the N second electronic devices further comprises:

Step S301: determining a first prompt effect of the P prompt effects corresponding to a first sub transmission stage at the time of T1 when the transmission between the first electronic device and the L second electronic devices is in the first sub transmission stage of the P sub transmission stages, wherein the fact that the first operation meets the first preset condition represents the transmission between the first electronic device and the L second electronic devices is in the first sub transmission stage;

Step S302: generating and outputting the first prompt effect;

Step S303: determining a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and Step S304: generating and outputting the second prompt effect.

The first prompt mode may be any prompt mode, such as, a mode of prompting with light effects, a mode of prompting with sounds, a mode of prompting with text, or the like.

The P sub transmission stages may comprise any number larger than 2 of sub transmission stages, such as, a sub transmission stage where there is a first correspondence relation between the first electronic device and the L second electronic devices but no data connection is established; a sub transmission stage where a data connection is established between the first electronic device and the L second electronic devices but no data transmission is performed; and a sub transmission stage where the data transmission is performed between the first electronic device and the L second electronic devices, or the like.

In step S301, the first sub transmission stage specifically is a stage where there are data transmission channels established between the first electronic device and the L second electronic devices, and the first prompt effect specifically is a prompt effect which prompts with light of a first preset intensity; or the first sub transmission stage specifically is a stage where there is a first correspondence relation between the first electronic device and the L second electronic devices but no data connection is established, and the first prompt effect specifically is a prompt effect which prompts with light of a second preset intensity.

Of course, in a specific implementation, the first sub transmission stage may be any other sub transmission stage, and the embodiments of the present application are not limited thereto.

For example, an LED light may be provided on surfaces of the first electronic device and the L second electronic devices. When there is the first correspondence relation between the first electronic device and the L second electronic devices and no data connection is established, the LED light is weaker; and when the data transmission channels are established between the first electronic device and the L second electronic devices, the LED light is stronger.

In step S303, the second sub transmission stage specifically is a stage where the first electronic device and the L second electronic devices perform data transmission therebetween, and the second prompt effect specifically is a prompt effect which prompts by emitting light at a preset frequency; or the second sub transmission stage specifically is a stage where there are the data transmission channels established between the first electronic device and the L second electronic devices but no data transmission is performed, and the second prompt effect specifically is a prompt effect which prompts with light of a third preset intensity.

Of course, in a specific implementation, the second sub transmission stage may be any other sub transmission stage, and the embodiments of the present application are not limited thereto.

To be specific, prompting is performed by turning on/off the LED lights provided on the surfaces of the first electronic device and the L second electronic devices at a preset frequency, such as, every 2 s, 3 s, etc. Furthermore, in a specific implementation, when the data transmission is performed between the first electronic device and the L second electronic devices, different prompts are generated based on different stages of the data transmission. For example, in the early stage of the data transmission, the flashing frequency of the LED lights is lower; when it comes to the end of the data transmission, the flashing frequency of the LED lights is higher; furthermore, at the end of the data transmission between the first electronic device and the L second electronic devices, the LED light may be controlled to stop flashing, and a light effect different from that for the first transmission stage is generated to prompt this.

From the above description, in the embodiments of the present application, when there are data transmissions between the first electronic device and the L second electronic devices, different prompt effects may be utilized to prompt based on the different stages of the data transmission performed between the first electronic device and the L second electronic devices. Therefore, a technical effect where the data transmission process performed between the first electronic device and the L second electronic devices can be prompted more precisely can be achieved.

In a specific implementation, after the establishing the data transmission channels between the first electronic device and the L second electronic devices of the N second electronic devices, the method further comprises:

acquiring first data from the L second electronic devices.

In a specific implementation, multiple manners in which the first data is acquired from the L second electronic devices may be used. Two of them are introduced below. Of course, in a specific implementation, it is not limited these two cases.

First, the acquiring first data from the L second electronic devices may comprise:

acquiring the first data from preset directories of the L second electronic devices.

To be specific, a shared directory is set up on any second electronic device of the L second electronic devices, for example, \\Cd-public_serve\SharedDirectory. Of course, the shared directory may be set up under other directory. After the data connection channels are established between the first electronic device and the L second electronic devices, the first data is acquired directly from the shared directory of the L second electronic devices. The first data is for example text data, picture data, video data, etc.

Second, the acquiring first data from the L second electronic devices may comprise:

acquiring the first data based on a second selection operation of the user.

To be specific, after the data connection is established between the first electronic device and the L second electronic devices, the file directories on each of the L second electronic devices are displayed on the first electronic device, and then the user of the first electronic device may determine the first data by a selection operation.

From the above description, in the embodiments of the present application, after the data transmission channels between the first electronic device and the L second electronic devices are established, the first electronic device may further acquire the first data from the L second electronic devices, wherein the first data may be acquired from the preset directories of the L second electronic devices, or the first data may be acquired based on the second selection operation of the user. Therefore, a technical effect where the manners in which the first data is acquired are more convenient and diversified can be achieved.

In a specific implementation, after the establishing the data transmission channels between the first electronic device and the L second electronic devices of the N second electronic devices, the method further comprises:

judging whether there is a second operation for the first electronic device which meets a second preset condition; and disconnecting the data transmission channels when there is a second operation.

In a specific implementation, the second operation may also be any operation, such as, an operation of clicking on a preset button, an operation of sliding in a direction opposite to the direction of the first operation, or the like. When the second operation occurs, it represents that the user of the first electronic device does not wish to perform data connections with the L second electronic devices, and therefore the data transmission channels are disconnected. In a specific implementation, after the data transmission channels are disconnected, the first electronic device may store the information of the L second electronic devices. In this way, when the first electronic device and the L second electronic devices establish the data transmission channels for the next time, there is no need for looking for the L second electronic devices; the first electronic device may also delete the information of the L second electronic devices to save the cache space of the first electronic device.

From the above description, in the embodiments of the present application, after the data transmission channels between the first electronic device and the L second electronic devices are established, if the second operation which meets the second preset condition is detected, the data transmission channels can be disconnected. Therefore, a technical effect where it is more convenient to control the data transmission process performed between the first electronic device and the L second electronic devices can be achieved.

Hereinafter, the method for processing information for use in the electronic device according to the present invention is introduced by several specific embodiments. The embodiments below introduce several possible application scenarios for the method for processing information. It should be noted that the embodiments of the present invention are provided for illustration purpose only, rather than limitations. All embodiments compliant with the ideas of the present invention are embraced in the scope of the present invention. The variants of the ideas of the present invention are obvious for one skilled in the art.

Embodiment 1

Figure 4A:
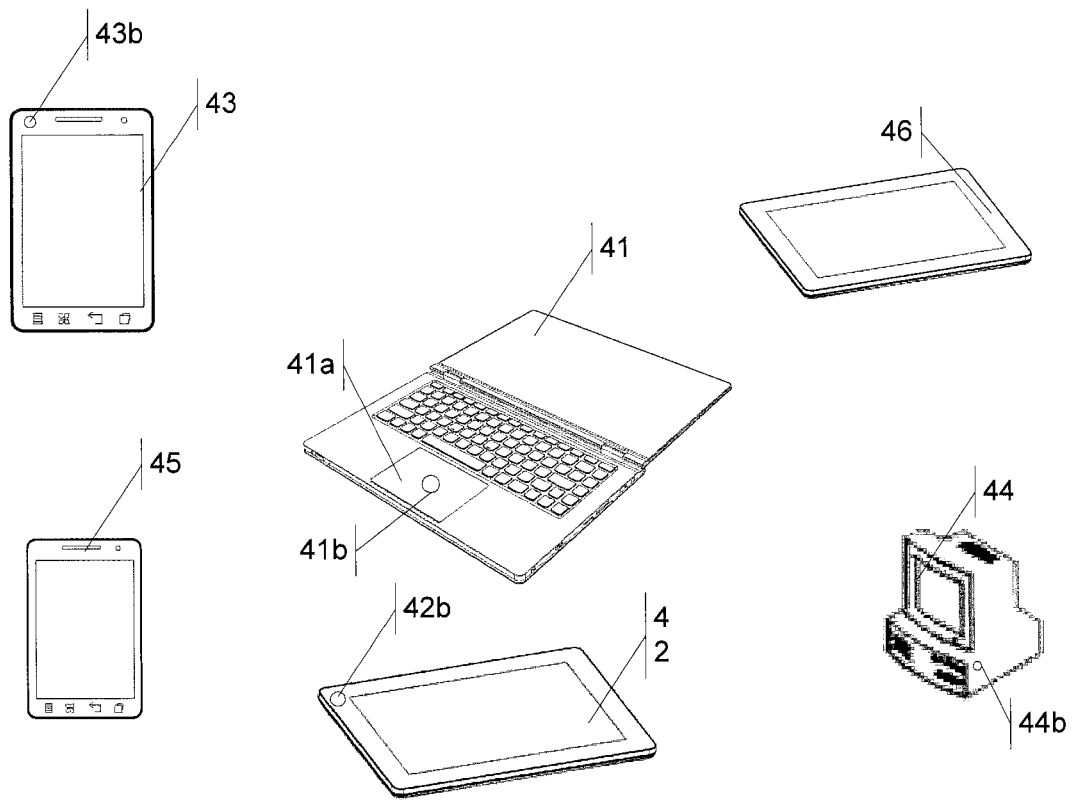
FIG. 4a is a schematic diagram showing six electronic devices in a network system according to Embodiment 1 of the present application.

In this embodiment, referring to FIG. 4a, an introduction is given with respect to, for example, a notebook computer 41 as an example. The notebook computer 41 comprises a touch panel 41a, and an LED light 41b is disposed on the bottom of the touch panel, wherein the notebook computer 41 supports the same data transmission protocol as a tablet computer 42, a cell phone 43, and a smart TV 44 do. All of the tablet computer 42, the cell phone 43, and the smart TV 44 comprise an LED light 42b corresponding to the LED light 41b of the notebook computer 41. The network system in which the notebook computer 41 resides further comprises a cell phone 45 and a tablet computer 46.

Figure 4B:
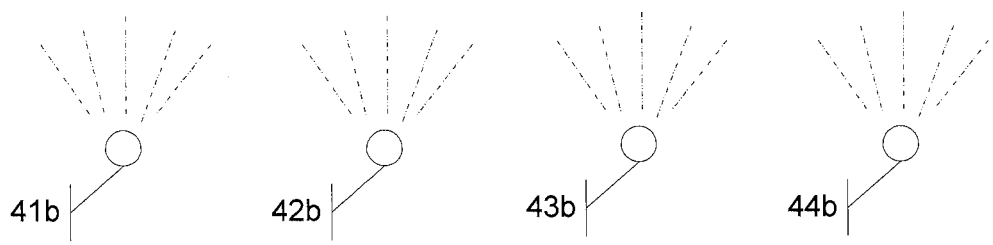
FIGS. 4b-4e are schematic diagrams showing LED lights in different stages for four electronic devices of the six electronic devices among which there are data transmission relations according to Embodiment 1 of the present application.

At the time of T1, the notebook computer 41, the tablet computer 42, the cellphone 43, the smart TV 44, the cell phone 45 and the tablet computer 46 are located within the same network system and connected to a server. The server determines that the notebook computer 41, the tablet computer 42, the cellphone 43, and the smart TV 44 support the same data transmission protocol. Therefore, as shown in FIG. 4b, all LED lights 41b, 42b, 43b, 44b of the notebook computer 41, the tablet computer 42, the cellphone 43 and the smart TV 44 are controlled to generate weak lights.

At the time of T2, the user A of the notebook computer 41 wishes to acquire a video clip from another electronic device, and therefore an operation of sliding from left to right is generated on the touch panel 41a of the notebook computer 41. After the sliding operation is detected by the notebook computer 41, a first connection request is transmitted to the server. After the server receives the first connection request, it determines that the electronic devices which support the same data transmission protocol as the notebook computer 41 comprise: the tablet computer 42, the cellphone 43, and the smart TV 44, and then transmits the first connection request to these three electronic devices. After these three electronic devices receive the first connection request, the tablet computer 42, the cell phone 43, and the smart TV 44 all agree to establish the data transmission channels with the notebook computer 41 by default. Then, they transmit corresponding feedback information to the notebook computer 41, respectively.

Figure 4C:
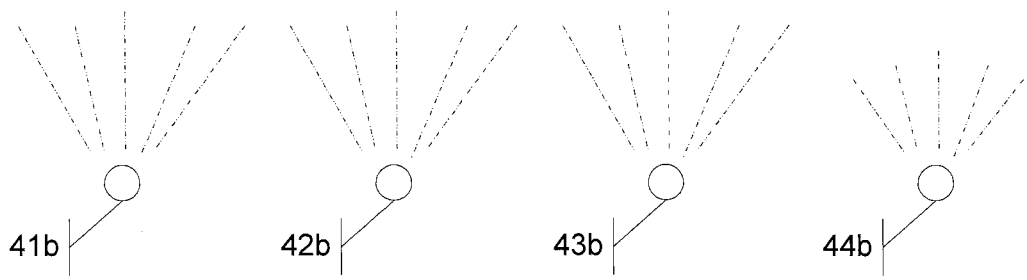
Figure 4D:
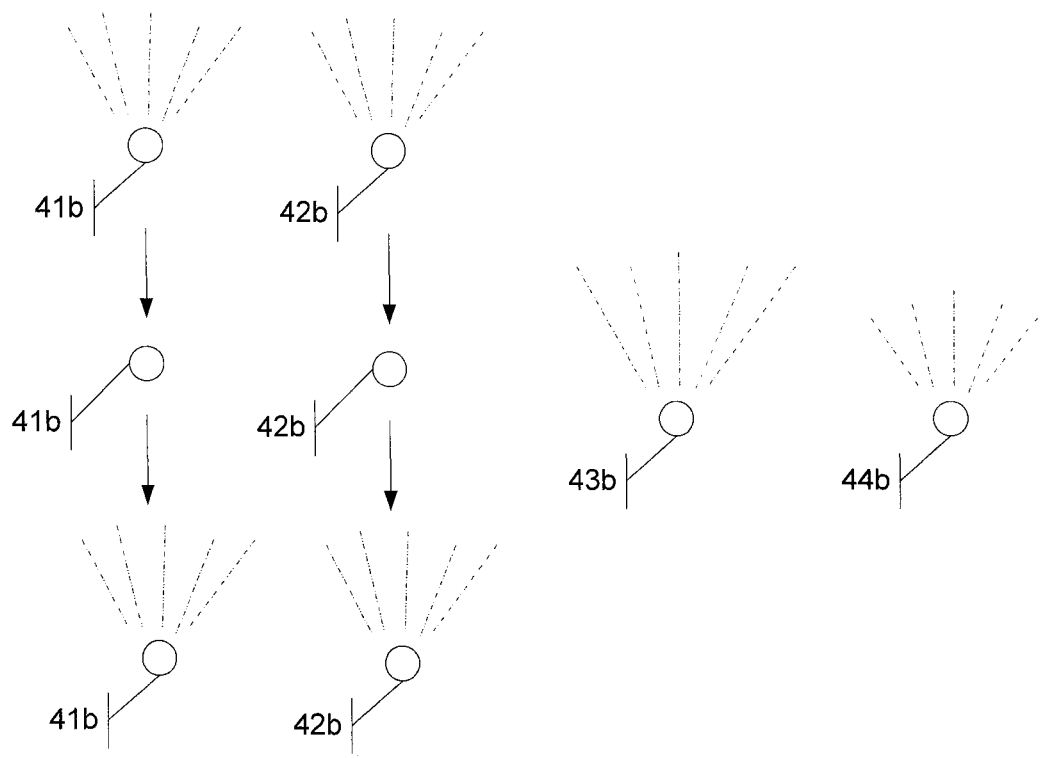

After the notebook computer 41 receives the corresponding feedback information, three pieces of identification information corresponding to these pieces of feedback information are displayed on the display screen of the notebook computer 41. After the user 41 views these three pieces of identification information, the pieces of identification information corresponding to the tablet computer 42 and the cellphone 43 are selected, and then the data transmission channels are established with the tablet computer 42 and the cell phone 43. As shown in FIG. 4c, the light of the corresponding LED lights 42b, 43b are controlled to be from weak to strong, while the light of the LED light 41b is also controlled to be from weak to strong.

At the time of T3, after the data transmission channels are established with the tablet computer 42 and the cellphone 43, the directory information of the tablet computer 42 and the cellphone 43 is displayed on the display screen of the notebook computer 41.

At the time of T4, with the selection operation of the user 41, the notebook computer 41 acquires a video clip from the tablet computer 42. During the process of transmission of the video file, as shown in FIG. 5d, the LED lights 41b of the notebook computer and the LED light 42b of the tablet computer 42 flash at a certain frequency to prompt the user A that the data transmission is performed.

Figure 4E:
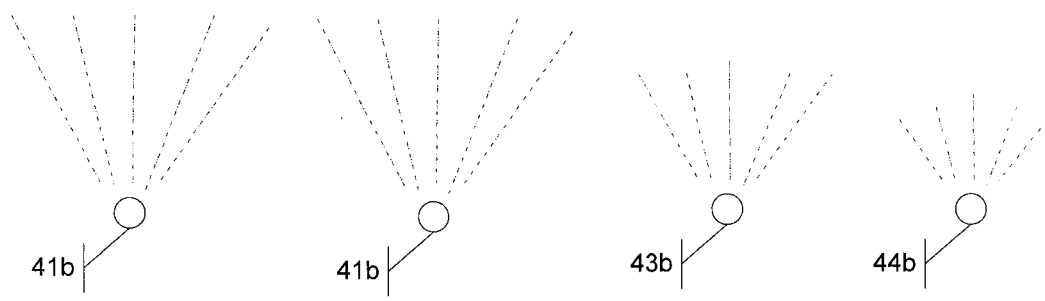

At the time of T5, the transmission of the video file is complete. As shown in FIG. 4e, the LED lights of the notebook computer 41 and the tablet computer 42 do not flash any longer, but emit stronger light. After the user 41 views the stronger light, the user determines that the transmission of the video file is complete, and generates an operation of sliding from the right to the left on the touch panel of the notebook computer 41. After the notebook computer 41 receives the sliding operation, it generates a disconnection request to disconnect the data transmission channels with the tablet computer 42 and the cellphone 43.

The LED light 51b of the notebook computer 51 and the LED light 42b of the tablet computer 42 generate weak light, as shown in FIG. 4b.

Embodiment 2

In this embodiment, an introduction is given with respect to, for example, a notebook computer A as an example. A first button and an LED light are provided on one side of the notebook computer A, wherein the notebook computer A supports the same data transmission protocol as tablet computer B, cell phone C, and smart TV D do. All of the tablet computer B, the cell phone C, and the smart TV D comprise an LED light corresponding to the LED light of the notebook computer A. The network system in which the notebook computer A resides further comprises cell phone E and tablet computer F.

At the time of T6, the user A clicks on the first button. After the notebook computer A detects the operation of clicking, a first connection request is broadcasted; the tablet computer B, the cellphone C, the smart TV D, the cellphone E, and the tablet computer F all receive the first connection request. The tablet computer B, the cell phone C, and the smart TV D all support the same data transmission protocol as the notebook computer A, and therefore they control the corresponding LED lights to generate stronger light to prompt the user A of the fact. The tablet computer B, the cell phone C, and the smart TV D will transmit corresponding feedback information to the notebook computer A. Because the cellphone E and the tablet computer F do not support the same data transmission protocol as the notebook computer A, they will not provide feedback in response to the first connection request.

At the time of T7, the identification information of the tablet computer B, the cell phone C, and the smart TV D are displayed on the display screen of the notebook computer A. The user A selects the smart TV D therefrom to establish the data transmission channel. Therefore, both of the LED lights of the notebook computer A and the smart TV D emit stronger light.

At the time of T8, the notebook computer A controls the playback of the audio file in the shared directory \\Cd-public_serve\ of the smart TV D, while the LED lights of the notebook computer A and the smart TV D flash at a certain frequency.

Embodiment 3

In this embodiment, an introduction is given with respect to, for example, a tablet computer A as an example. The network system in which the tablet computer A resides further comprises notebook computer B, cell phone C and smart TV D. An LED light is provided on one side of each of the tablet computer A, the notebook computer B, the cellphone C, and the smart TV D. Data transmissions were previously performed between the tablet computer A with the notebook computer B and the cellphone C, respectively, and therefore the LED lights of the tablet computer A, the notebook computer B, and the cellphone C emit weak light.

At the time of T9, a user A wishes to acquire a document named "A.word" in the network system in which the tablet computer A resides. Therefore, the user A first clicks on a preset button on the tablet computer A. After the tablet computer A detects the clicking operation of the user A, it transmits a first connection request to the notebook computer B and the cell phone C directly. After the notebook computer B and the cell phone C receive the first connection request, they transmit to the tablet computer A feedback information representing consent to establish the connection.

At the time of T10, the identification information of the notebook computer B, the cellphone C are displayed on the display screen of the tablet computer A. Then, the user A marks the identification information of the notebook computer B and the cellphone C with a checkmark to select the notebook computer B and the cellphone C with which the data transmission channels are to be established. After the tablet computer A detects the selection operation of the user A, it establishes the data transmission channels with the notebook computer B and the cellphone C. After that, the LED lights of the tablet computer A, the notebook computer B, and the cellphone C emit stronger light.

At the time of T11, the directories of the notebook computer B and the cellphone C are displayed on the display screen of the tablet computer. The user A selects the document "A.word" from the notebook computer B for transmission. After the tablet computer A detects an operation of confirming the transmission from the user A, it controls the LED light of the tablet computer A to flash at a certain frequency, while it controls the LED light of the notebook computer B to flash at a certain frequency as well. With the transmission progress of the document "A.word," the flashing frequency of the LED lights of the tablet computer A and the notebook computer B becomes faster. When the transmission of the document "A.word" is complete, the LED lights of the tablet computer A and the notebook computer B stop flashing, and emit stronger light.

At the time of T12, the user A wish to stop the data transmission channels established with the notebook computer B and the cellphone C, and therefore he/she clicks on the preset button. After the tablet computer A detects the operation of the user 52, it transmits a disconnection request to the notebook computer B and the cellphone C, while the tablet computer A controls the intensity of the flash light of the tablet computer A to be from strong to weak. After the notebook computer B and the cellphone C receive the disconnection request, they disconnect the data transmission channels with the tablet computer A, and control their LED lights to emit weak light.

In another aspect, based on the same inventive concept, the present invention provides an electronic device by means of another embodiment of the present invention. The electronic device is the first electronic device introduced in the method for processing information in the present application. There is a first correspondence relation between the electronic device and N second electronic devices, where N is an integer greater than or equal to 1.

Figure 5:
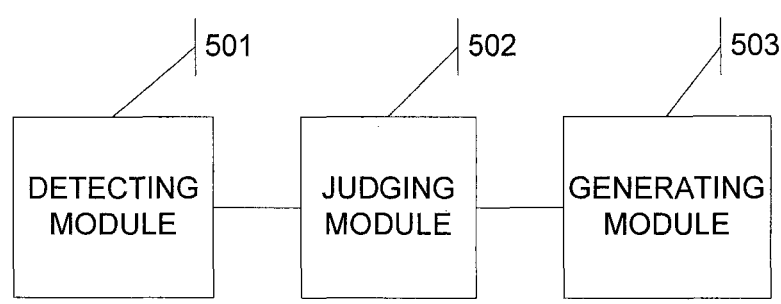
FIG. 5 is a structure diagram showing an electronic device according to an embodiment of the present application.

Referring to FIG. 5, the electronic device comprises:
a detecting module 501 configured to detect to acquire a first operation for the electronic device;
a judging module 502 configured to judge whether the first operation meets a first preset condition; and
a generating module 503 configured to generate, by the electronic device, a first prompt effect for the first operation and controlling each of the N second electronic devices to generate the first prompt effect when the first operation meets the first preset condition.

In a specific implementation, the judging module 502 is further configured to judge whether the first operation is an operation of data transmission.

In a specific implementation, the generating module 503 may control the N second electronic devices to generate the first prompt effect in multiple manners. Three of them will be introduced below. Of course, in a specific implementation, it is not limited to these three cases.

First, when there are data connections between the N second electronic devices and the electronic device, the generating module 503 is further configured to:
transmit first connection requests to the N second electronic devices such that the N second electronic devices generate the first prompt effect based on the first connection requests.

Second, when the electronic device is connected to the N second electronic devices via a server, the generating module is further configured to:
transmit a first connection request to the server such that the N second electronic devices are controlled by the server to generate the first prompt effect.

Third, the generating module 503 is further configured to:
broadcast a first connection request in the network system in which the electronic device resides such that the N second electronic devices generate the first prompt effect after they have received the first connection request.

From the above description, in the embodiments of the present application, the N second electronic devices may be controlled in multiple manners to generate the first prompt effect. For example, when there are data connections between the first electronic device and the N second electronic devices, the N second electronic devices are controlled to generate the first prompt effect based on the first connection requests sent to the N second electronic devices; or when the first electronic device is connected to the N second electronic devices via the server, the first connection request is sent to the server so as to control the N second electronic devices to generate the first prompt effects; or the first connection request is broadcasted in the network system in which the first electronic device resides so as to control the N second electronic devices to generate the first prompt information; or the like. Therefore, a technical effect where the N electronic devices are controlled to generate the first prompt information in a diversified manner can be achieved In a specific implementation, the electronic device further comprises:
an establishing module configured to, after it is judged whether the first operation meets a first preset condition, establish data transmission channels between the electronic device and L second electronic devices of the N second electronic devices when the first operation meets the first preset condition, where L is an integer less than or equal to N.

In a specific implementation, the establishing module further comprises:
a receiving unit configured to receive K pieces of feedback information sent from K second electronic devices of the N second electronic devices, wherein the feedback information represents consent to establish the data connection with the electronic device, and K is an integer greater than or equal to L and less than or equal to N; and
an establishing unit configured to establish the data transmission channels between the electronic device and the L second electronic devices based on the K pieces of feedback information.

In a specific implementation, the establishing unit further comprises:
a displaying sub-unit configured to display K pieces of identification information corresponding to the K pieces of feedback information on a display unit of the electronic device;

a determining sub-unit configured to determine L pieces of identification information of the K identification information corresponding to the L second electronic devices based on a first selection operation from the user of the electronic device;

an establishing sub-unit configured to establish the data transmission channels between the electronic device and the L second electronic devices based on the L pieces of identification information.

In a specific implementation, when the data transmission comprises at least P sub transmission stages and the P sub transmission stages correspond to P prompt effects in a first prompt mode in a one-to-one manner, where P is an integer greater than or equal to 2, the establishing module further comprises:

a first determining unit configured to determine a first prompt effect of the P prompt effects corresponding to a first sub transmission stage at the time of T1 when the transmission between the electronic device and the L second electronic devices is in the first sub transmission stage of the P sub transmission stages, wherein the fact that the first operation meets the first preset condition represents the transmission between the electronic device and the L second electronic devices is in the first sub transmission stage;

a first generating unit configured to generate and output the first prompt effect;

a second determining unit configured to determine a second prompt effect of the P prompt effects corresponding to a second sub transmission stage at the time of T2 which is later than T1 when the transmission between the electronic device and the L second electronic devices is in the second sub transmission stage of the P sub transmission stages, wherein the second prompt effect is a prompt effect different from the first prompt effect; and a second generating unit configured to generate and output the second prompt effect.

The first sub transmission stage specifically is a stage where there are data transmission channels established between the electronic device and the L second electronic devices, and the first prompt effect specifically is a prompt effect which prompts with light of a first preset intensity; or the first sub transmission stage specifically is a stage where there is a first correspondence relation between the electronic device and the L second electronic devices but no data connection is established, and the first prompt effect specifically is a prompt effect which prompts with light of a second preset intensity; or the second sub transmission stage specifically is a stage where the electronic device and the L second electronic devices perform data transmission therebetween, and the second prompt effect specifically is a prompt effect which prompts by emitting light at a preset frequency; or the second sub transmission stage specifically is a stage where there are data transmission channels established between the electronic device and the L second electronic devices but no data transmission is performed, and the second prompt effect specifically is a prompt effect which prompts with light of a third preset intensity.

From the above description, in the embodiments of the present application, when the first operation meets the first preset condition, the data transmission channels may be established between the first electronic device and L second electronic devices of the N second electronic devices, and different stages of the data transmission performed between the first electronic device and the L second electronic devices can be prompted by different prompt effects. Therefore, a technical effect where the data transmission process performed between the first electronic device and the L second electronic devices can be prompted more precisely can be achieved.

In a specific implementation, the electronic device further comprises:

an acquiring module configured to, after data transmission channels have been established between the electronic device and L second electronic devices of the N second electronic devices, acquire first data from the L second electronic devices.

In a specific implementation, the acquiring module is further configured to:

acquire the first data from preset directories of the L second electronic devices; or acquire the first data based on a second selection operation of the user.

From the above description, in the embodiments of the present application, after the data transmission channels between the first electronic device and the L second electronic devices are established, the first electronic device may further acquire the first data from the L second electronic devices, wherein the first data may be acquired from the preset directories of the L second electronic devices, or the first data may be acquired based on the second selection operation of the user. Therefore, a technical effect where the manners in which the first data is acquired are more convenient and diversified can be achieved.

In a specific implementation, the electronic device further comprises:

a judging module configured to, after the data transmission channels have been established between the electronic device and the L second electronic devices of the N second electronic devices, judge whether there is a second operation for the electronic device which meets a second preset condition; and a disconnecting module configured to disconnect the data transmission channels when there is a second operation.

From the above description, in the embodiments of the present application, after the data transmission channels between the first electronic device and the L second electronic devices are established, if the second operation which meets the second preset condition is detected, the data transmission channels can be disconnected. Therefore, a technical effect where it is more convenient to control the data transmission process performed between the first electronic device and the L second electronic devices can be achieved.

In another aspect, based on the same inventive concept, the present application provides, by means of another embodiment, another electronic device. The electronic device is the first electronic device introduced in the method for processing information in the present application. There is data transmission between the electronic device and L second electronic devices, where L is an integer greater than or equal to 1. The data transmission comprises at least P sub transmission stages, and the P sub transmission stages correspond to P prompt effects in a first prompt mode in a one-to-one manner, wherein P is an integer greater than or equal to 2.

Figure 6:
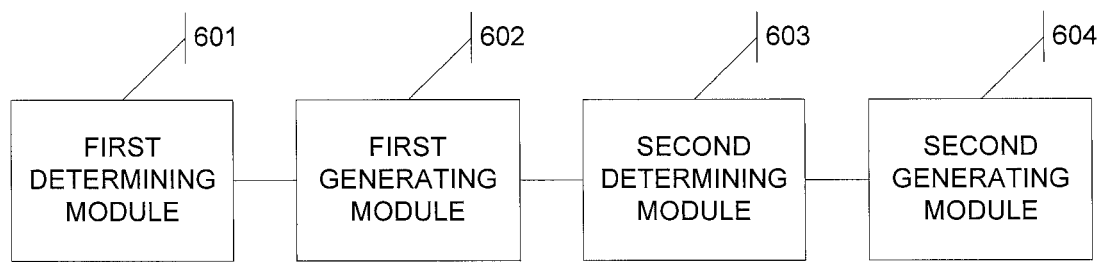
FIG. 6 is a structure diagram showing an electronic device according to another embodiment of the present application.

Referring to FIG. 6, the electronic device comprises:

a first determining module 601 configured to determine a first prompt effect of the P prompt effects corresponding to a first sub transmission stage at the time of T1 when the transmission between the electronic device and the L second electronic devices is in the first sub transmission stage of the P sub transmission stages;

a first generating module 602 configured to generate and output the first prompt effect;

a second determining module 603 configured to determine a second prompt effect of the P prompt effects corresponding to a second sub transmission stage at the time of T2 which is later than T1 when the transmission between the electronic device and the L second electronic devices is in the second sub transmission stage of the P sub transmission stages, wherein the second prompt effect is a prompt effect different from the first prompt effect; and a second generating module 604 configured to generate and output the second prompt effect.

In a specific implementation, the first sub transmission stage specifically is a stage where there are data transmission channels established between the electronic device and the L second electronic devices, and the first prompt effect specifically is a prompt effect which prompts with light of a first preset intensity; or the first sub transmission stage specifically is a stage where there is a first correspondence relation between the electronic device and the L second electronic devices but no data connection is established, and the first prompt effect specifically is a prompt effect which prompts with light of a second preset intensity; or the second sub transmission stage specifically is a stage where the electronic device and the L second electronic devices perform data transmission therebetween, and the second prompt effect specifically is a prompt effect which prompts by emitting light at a preset frequency; or the second sub transmission stage specifically is a stage where there are the data transmission channels established between the electronic device and the L second electronic devices but no data transmission is performed, and the second prompt effect specifically is a prompt effect which prompts with light of a third preset intensity.

From the above description, the above electronic device is used for implementing the method for controlling the electronic device. Therefore, the operation process of the electronic device is consistent with the one or more embodiments of the above method, and will be omitted for simplicity.

The one or more technical solutions provided by the embodiments of the present application have at least following technical effects or advantages.

(1) In the embodiments of the present application, when there is a first correspondence relation between the first electronic device and the N second electronic devices, if there is a first operation for the first electronic device which meets the first preset condition, the first electronic device and the N second electronic devices may be controlled to generate the first prompt effect. Therefore, the correspondence relation between the first electronic device and the N second electronic devices can be prompted, and thereby a technical effect where the correspondence relation among multiple electronic devices can be determined conveniently can be achieved.

(2) In the embodiments of the present application, the N second electronic devices may be controlled in multiple manners to generate the first prompt effect. For example, when there are data connections between the first electronic device and the N second electronic devices, the N second electronic devices are controlled to generate the first prompt effect based on the first connection requests sent to the N second electronic devices; or when the first electronic device is connected to the N second electronic devices via the server, the first connection request is sent to the server so as to control the N second electronic devices to generate the first prompt effects; or the first connection request is broadcasted in the network system in which the first electronic device resides so as to control the N second electronic devices to generate the first prompt information; or the like. Therefore, a technical effect where the N electronic devices are controlled to generate the first prompt information in a diversified manner can be achieved.

(3) In the embodiments of the present application, the data transmission channels may be established between the first electronic device and the L second electronic devices of the N second electronic devices, and different prompt effects can be utilized based on different stages of the data transmission. Therefore, a technical effect where the data transmission process performed between the first electronic device and the N second electronic devices can be prompted more precisely can be achieved.

(4) In the embodiments of the present application, after the data transmission channels between the first electronic device and the L second electronic devices are established, the first electronic device may further acquire first data from the L second electronic devices, wherein the first data may be acquired from the preset directories of the L second electronic devices, or the first data may be acquired based on the second selection operation of the user. Therefore, a technical effect where the manners in which the first data is acquired are more convenient and diversified can be achieved.

(5) In the embodiments of the present application, after the data transmission channels between the first electronic device and the L second electronic devices are established, if a second operation which meets the second preset condition is detected, the data transmission channels can be disconnected. Therefore, a technical effect where it is more convenient to control the data transmission process performed between the first electronic device and the L second electronic devices can be achieved.

Although the preferred embodiments of the present invention have been described, one skilled in the art may make other alterations and modifications to these embodiments once they know the fundamental inventive concepts. Therefore, the following claims intends to cover the preferred embodiments and all alterations and modifications which fall into the scope of the present invention.

Obviously, one skilled in the art may make any modifications and variants of the present invention without departing from the spirit and scope of the present invention. In this way, if these modifications and variants of the present invention fall into the scope of the claims of the present invention and their equivalents, the present invention may also intend to cover these modifications and variants.

What is claimed is:

1. A method for processing information for use in a first electronic device, wherein there is a first correspondence relation between the first electronic device and N second electronic devices, where N is an integer greater than or equal to 1, the method comprising:

detecting to acquire a first operation for the first electronic device;

judging whether the first operation meets a first preset condition; and generating, by the first electronic device, a first prompt effect for the first operation and controlling each of the N second electronic devices to generate the first prompt effect when the first operation meets the first preset condition, wherein the first prompt effect comprises a mode of the first electronic device and the N second electronic devices emitting light with the same intensity or frequency.

2. The method according to claim 1, wherein the judging whether the first operation meets a first preset condition comprises:

judging whether the first operation is an operation of data transmission.

3. The method according to claim 2, wherein the controlling each of the N second electronic devices to generate the first prompt effect comprises at least one of:

transmitting first connection requests to the N second electronic devices such that the N second electronic devices generate the first prompt effect based on the first connection requests in case that there are data connections between the N second electronic devices and the first electronic device;

transmitting a first connection request to a server such that the N second electronic devices are controlled by the server to generate the first prompt effect in case that the first electronic device is connected to the N second electronic devices via the server; and broadcasting a first connection request in the network system in which the first electronic device resides such that the N second electronic devices generate the first prompt effect after they have received the first connection request.

4. The method according to claim 2, wherein after the judging whether the first operation meets a first preset condition, the method further comprises:

establishing data transmission channels between the first electronic device and L second electronic devices of the N second electronic devices when the first operation meets the first preset condition, where L is an integer less than or equal to N.

5. The method according to claim 4, wherein the establishing data transmission channels between the first electronic device and the L second electronic devices of the N second electronic devices comprises:

receiving K pieces of feedback information sent from K second electronic devices of the N second electronic devices, wherein the feedback information represents consent to establish the data connection with the first electronic device, and K is an integer greater than or equal to L and less than or equal to N; and establishing the data transmission channels between the first electronic device and the L second electronic devices based on the K pieces of feedback information.

6. The method according to claim 5, wherein the establishing the data transmission channels between the first electronic device and the L second electronic devices based on the K pieces of feedback information comprises:

displaying K pieces of identification information corresponding to the K pieces of feedback information on a display unit of the first electronic device;

determining L pieces of identification information of the K identification information corresponding to the L second electronic devices based on a first selection operation from the user of the first electronic device; and establishing the data transmission channels between the first electronic device and the L second electronic devices based on the L pieces of identification information.

7. The method according to claim 4, wherein the data transmission comprises at least P sub transmission stages and the P sub transmission stages correspond to P prompt effects in a first prompt mode in a one-to-one manner, wherein P is an integer greater than or equal to 2, and wherein the establishing the data transmission channels between the first electronic device and the L second electronic devices of the N second electronic devices comprises:

determining a first prompt effect of the P prompt effects corresponding to a first sub transmission stage at the time of T1 when the transmission between the first electronic device and the L second electronic devices is in the first sub transmission stage of the P sub transmission stages, wherein the fact that the first operation meets the first preset condition represents the transmission between the first electronic device and the L second electronic devices is in the first sub transmission stage;

generating and outputting the first prompt effect;

determining a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and generating and outputting the second prompt effect.

8. The method according to claim 7, wherein the first sub transmission stage is a stage where there are data transmission channels established between the first electronic device and the L second electronic devices, and the first prompt effect is a prompt effect which prompts with light of a first preset intensity; or the first sub transmission stage is a stage where there is a first correspondence relation between the first electronic device and the L second electronic devices but no data connection is established, and the first prompt effect is a prompt effect which prompts with light of a second preset intensity; or the second sub transmission stage is a stage where the first electronic device and the L second electronic devices perform data transmission therebetween, and the second prompt effect is a prompt effect which prompts by emitting light at a preset frequency; or the second sub transmission stage is a stage where there are the data transmission channels established between the first electronic device and the L second electronic devices but no data transmission is performed, and the second prompt effect is a prompt effect which prompts with light of a third preset intensity.

9. The method according to claim 4, wherein after the establishing the data transmission channels between the first electronic device and the L second electronic devices of the N second electronic devices, the method further comprises:

acquiring first data from the L second electronic devices.

10. The method according to claim 9, wherein the acquiring first data from the L second electronic devices comprises:

acquiring the first data from preset directories of the L second electronic devices; or acquiring the first data based on a second selection operation of the user.

11. The method according to claim 4, wherein after the establishing the data transmission channels between the first electronic device and the L second electronic devices of the N second electronic devices, the method further comprises:
- judging whether there is a second operation for the first electronic device which meets a second preset condition; and
- disconnecting the data transmission channels when there is a second operation.

12. An electronic device, wherein there is a first correspondence relation between the electronic device and N second electronic devices, where N is an integer greater than or equal to 1, the electronic device comprising:
- a detecting module configured to detect to acquire a first operation for the electronic device;
- a judging module configured to judge whether the first operation meets a first preset condition; and
- a generating module configured to generate, by the electronic device, a first prompt effect for the first operation and controlling each of the N second electronic devices to generate the first prompt effect when the first operation meets the first preset condition, wherein the first prompt effect comprises a mode of the first electronic device and the N second electronic devices emitting light with the same intensity or frequency.

13. The electronic device according to claim 12, wherein the judging module is further configured to:
- judge whether the first operation is an operation of data transmission.

14. The electronic device according to claim 13, wherein, the generating module is further configured to:
- transmit first connection requests to the N second electronic devices such that the N second electronic devices generate the first prompt effect based on the first connection requests in case that there are data connections between the electronic device and the N second electronic devices; or
- transmit a first connection request to a server such that the N second electronic devices are controlled by the server to generate the first prompt effect in case that the electronic device is connected to the N second electronic devices via the server;
- broadcast a first connection request in the network system in which the electronic device resides such that the N second electronic devices generate the first prompt effect after they have received the first connection requests.

15. The electronic device according to claim 12, wherein the electronic device further comprises:
- an establishing module configured to, after it is judged whether the first operation meets a first preset condition, establish data transmission channels between the electronic device and L second electronic devices of the N second electronic devices when the first operation meets the first preset condition, where L is an integer less than or equal to N.

16. The electronic device according to claim 15, wherein the establishing module comprises:
- a receiving unit configured to receive K pieces of feedback information sent from K second electronic devices of the N second electronic devices, wherein the feedback information represents consent to establish the data connection with the electronic device, and K is an integer greater than or equal to L and less than or equal to N; and
- an establishing unit configured to establish the data transmission channels between the electronic device and the L second electronic devices based on the K pieces of feedback information.

17. The electronic device according to claim 16, wherein the establishing unit further comprises:
- a displaying sub-unit configured to display K pieces of identification information corresponding to the K pieces of feedback information on a display unit of the electronic device;
- a determining sub-unit configured to determine L pieces of identification information of the K identification information corresponding to the L second electronic devices based on a first selection operation from the user of the electronic device; and
- an establishing sub-unit configured to establish the data transmission channels between the electronic device and the L second electronic devices based on the L pieces of identification information.

18. The electronic device according to claim 15, wherein when the data transmission comprises at least P sub transmission stages and the P sub transmission stages correspond to P prompt effects in a first prompt mode in a one-to-one manner, where P is an integer greater than or equal to 2, the establishing module comprises:
- a first determining unit configured to determine a first prompt effect of the P prompt effects corresponding to a first sub transmission stage at the time of T1 when the transmission between the electronic device and the L second electronic devices is in the first sub transmission stage of the P sub transmission stages, where the fact that the first operation meets the first preset condition represents the transmission between the electronic device and the L second electronic devices is in the first sub transmission stage;
- a first generating unit configured to generate and output the first prompt effect;
- a second determining unit configured to determine a second prompt effect of the P prompt effects corresponding to a second sub transmission stage at the time of T2 which is later than T1 when the transmission between the electronic device and the L second electronic devices is in the second sub transmission stage of the P sub transmission stages, where the second prompt effect is a prompt effect different from the first prompt effect; and
- a second generating unit configured to generate and output the second prompt effect.

19. The electronic device according to claim 18, wherein the first sub transmission stage is a stage where there are data transmission channels established between the electronic device and the L second electronic devices, and the first prompt effect is a prompt effect which prompts with light of a first preset intensity; or
- the first sub transmission stage is a stage where there is a first correspondence relation between the electronic device and the L second electronic devices but no data connection is established, and the first prompt effect is a prompt effect which prompts with light of a second preset intensity; or
- the second sub transmission stage is a stage where the electronic device and the L second electronic devices perform data transmission therebetween, and the second prompt effect is a prompt effect which prompts by emitting light at a preset frequency; or
- the second sub transmission stage is a stage where there are data transmission channels established between the electronic device and the L second electronic devices but no data transmission is performed, and the second prompt effect is a prompt effect which prompts with light of a third preset intensity.

20. The electronic device according to claim 15, wherein the electronic device further comprises:
an acquiring module configured to, after the data transmission channels between the electronic device and the L second electronic devices of the N second electronic devices have been established, acquire first data from the L second electronic devices.

21. The electronic device according to claim 20, wherein the acquiring module is further configured to:
acquire the first data from preset directories of the L second electronic devices; or
acquire the first data based on a second selection operation of the user.

22. The electronic device according to claim 15, wherein the electronic device further comprises:
a judging module configured to, after the data transmission channels between the electronic device and the L second electronic devices of the N second electronic devices have been established, judge whether there is a second operation for the electronic device which meets a second preset condition; and
a disconnecting module configured to disconnect the data transmission channels when there is a second operation.

23. A prompting method for use in a first electronic device, wherein there is data transmission between the first electronic device and L second electronic devices, where L is an integer greater than or equal to 1, the data transmission comprises at least P sub transmission stages, and the P sub transmission stages correspond to P prompt effects in a first prompt mode in a one-to-one manner, where P is an integer greater than or equal to 2, the method comprising:
determining a first prompt effect of the P prompt effects corresponding to a first sub transmission stage at the time of T1 when the transmission between the first electronic device and the L second electronic devices is in the first sub transmission stage of the P sub transmission stages, wherein the first prompt effect comprises a mode of the first electronic device and the N second electronic devices emitting light with the same intensity or frequency;
generating and outputting the first prompt effect;
determining a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and
generating and outputting the second prompt effect.

24. The method according to claim 23, wherein the first sub transmission stage is a stage where there are data transmission channels established between the first electronic device and the L second electronic devices, and the first prompt effect is a prompt effect which prompts with light of a first preset intensity; or
the first sub transmission stage is a stage where there is a first correspondence relation between the first electronic device and the L second electronic devices but no data connection is established, and the first prompt effect is a prompt effect which prompts with light of a second preset intensity; or
the second sub transmission stage is a stage where the first electronic device and the L second electronic devices perform data transmission therebetween, and the second prompt effect is a prompt effect which prompts by emitting light at a preset frequency; or
the second sub transmission stage is a stage where there are data transmission channels established between the first electronic device and the L second electronic devices but no data transmission is performed, and the second prompt effect is a prompt effect which prompts with light of a third preset intensity.

25. An electronic device, wherein there is data transmission between the electronic device and L second electronic devices, where L is an integer greater than or equal to 1, the data transmission comprises at least P sub transmission stages, and the P sub transmission stages correspond to P prompt effects in a first prompt mode in a one-to-one manner, where P is an integer greater than or equal to 2, the electronic device comprising:
a first determining module configured to determine a first prompt effect of the P prompt effects corresponding to a first sub transmission stage at the time of T1 when the transmission between the electronic device and the L second electronic devices is in the first sub transmission stage of the P sub transmission stages, wherein the first prompt effect comprises a mode of the first electronic device and the N second electronic devices emitting light with the same intensity or frequency;
a first generating module configured to generate and output the first prompt effect;
a second determining module configured to determine a second prompt effect of the P prompt effects corresponding to a second sub transmission stage at the time of T2 which is later than T1 when the transmission between the first electronic device and the L second electronic devices is in the second sub transmission stage of the P sub transmission stages, wherein the second prompt effect is a prompt effect different from the first prompt effect; and
a second generating module configured to generate and output the second prompt effect.

26. The electronic device according to claim 25, wherein the first sub transmission stage is a stage where there are data transmission channels established between the electronic device and the L second electronic devices, and the first prompt effect is a prompt effect which prompts with light of a first preset intensity; or
the first sub transmission stage is a stage where there is a first correspondence relation between the electronic device and the L second electronic devices but no data connection is established, and the first prompt effect is a prompt effect which prompts with light of a second preset intensity; or
the second sub transmission stage is a stage where the electronic device and the L second electronic devices perform data transmission therebetween, and the second prompt effect is a prompt effect which prompts by emitting light at a preset frequency; or
the second sub transmission stage is a stage where there are data transmission channels established between the electronic device and the L second electronic devices but no data transmission is performed, and the second prompt effect is a prompt effect which prompts with light of a third preset intensity.

* * * * *